G. WILLIAMS.
LOCK JOINT.
APPLICATION FILED JAN. 19, 1917.
1,235,867.
Patented Aug. 7, 1917.
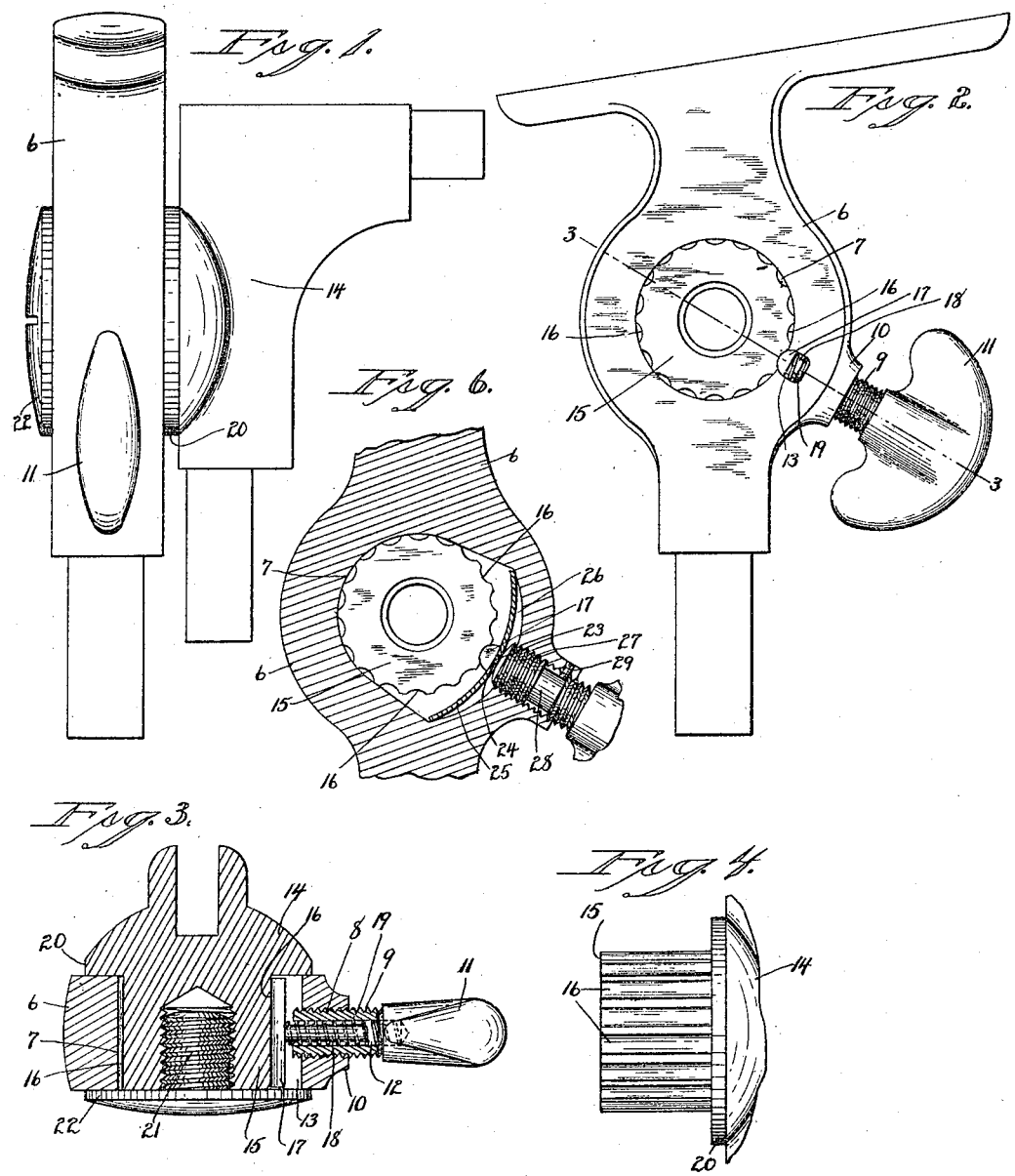

UNITED STATES PATENT OFFICE.

GORDON WILLIAMS, OF MOUNT CARMEL, CONNECTICUT, ASSIGNOR TO THE ENGLISH & MERSICK CO., OF NEW HAVEN, CONNECTICUT, A CORPORATION.

LOCK-JOINT.

1,235,867.  Specification of Letters Patent.  Patented Aug. 7, 1917.

Application filed January 19, 1917. Serial No. 143,393.

*To all whom it may concern:*

Be it known that I, GORDON WILLIAMS, a citizen of the United States, residing at Mount Carmel, in the county of New Haven and State of Connecticut, have invented a new and useful Improvement in Lock-Joints; and I do hereby declare the following, when taken in connection with the accompanying drawings and the characters of reference marked thereon, to be a full, clear, and exact description of the same, and which said drawings constitute part of this application, and represent, in—

Figure 1 a front view of a lock joint constructed in accordance with my invention.

Fig. 2 a side view of the same with the hub-retaining screw removed.

Fig. 3 a sectional view on the line 3—3 of Fig. 2, with the hub screw in place.

Fig. 4 a side view of the hub portion of the movable member.

Fig. 5 a perspective view of the key, detached.

Fig. 6 a sectional view illustrating a modified form of my invention.

This invention relates to an improvement in lock joints particularly adapted for use on wind shields and glass fronts for motor vehicles, the object of the invention being to provide a device which permits of the ready adjustment of parts, and also to provide for a positive lock when the parts are adjusted to the desired position; and the invention consists in certain details of construction as will be hereinafter described and particularly recited in the claims.

In carrying out my invention, I employ the usual head 6 adapted to be supported in the usual way, one head being arranged at each side of the wind shield or glass front. This head is formed with a circular opening 7 which is intersected by a threaded hole 8 for the reception of a screw 9, the head being preferably formed with a boss 10 to give additional support for the screw. This screw is provided with the usual thumb piece 11 and is formed in its shank with a longitudinal recess 12 for the purpose as will hereinafter appear. The head is also formed with a transverse notch 13 in line with the center of the screw hole 8. The movable part 14 of the wind shield or glass front is formed with a hub 15 adapted to fit the opening 7 in the head, and this hub is formed with a series of segmental grooves 16. Located in the notch 13 is a key 17 substantially half round in cross section and formed with a shank 18 adapted to enter the recess 12 in the screw 9, and around this shank is a spring 19 which has a bearing at one end against the flat face of the key 17, and at the opposite end in the recess 12. The rounded face of the key is adapted to enter into any one of the grooves 16 in the hub 15. The hub is formed on one side with the usual flange 20 and is held in place in the head 6 by means of a screw 21 having a large flat head 22 which overlaps the face of the head and, it may be noted as in Fig. 3, overlaps and covers the transverse notch 13. If the screw 9 be turned slightly outward as indicated in Figs. 2 and 3 of the drawings, the head 15 may be turned in the head to adjust the shield to any desired position. In turning, the key yields under the pressure of its spring to permit the hub to be easily turned. When the shield is adjusted to the desired position, the screw 9 is turned inward to come to a bearing against the flat face of the key, and crowd that key into one of the grooves in the hub; and as the sides of the key rest in the notch 13, it cannot be moved and consequently the hub is rigidly held in the head. Only a slight movement of the screw is required to provide for sufficient play for the key to allow the hub to be turned. When the screw is turned out the key acts like a pawl engaging with the grooves in the hub as in a ratchet.

Instead of forming the key 17 with a long shank 18 adapted to enter the recess 12 in the screw 9, the key 17 may have a very short shank 23 adapted to enter a hole 24 formed in a flat spring 25 seated in a recess 26 in the head as shown in Fig. 6. In this case the screw 27 bears directly against the spring to force the key into engagement with the hub. As only a slight movement of the screw is required to relieve the key from positive engagement with the hub, the screw 27 may be formed with an annular groove 28 into which the set screw 29 may extend, this set screw 29 permitting the screw 27 to be turned in or out sufficiently to lock or release the hub and yet prevent the entire withdrawal of the screw.

I claim:—

1. A lock joint comprising a head formed with a circular opening, a screw hole intersecting said opening, a transverse notch intersecting the screw hole and opening into a central recess, a hub fitting in said opening and formed with a series of longiudinal segmental grooves, a key in said notch having a rounded face adapted to enter the grooves in the hub, a screw entering the screw hole and adapted to force the key into engagement with the hub, and a spring between the screw and key.

2. A lock joint comprising a head formed with a circular opening, a screw hole intersecting said opening, said head also formed with a notch intersecting the screw hole, a hub in said opening, said hub formed with longitudinal segmental grooves, a key in said notch having a rounded face adapted to enter the grooves in the hub, said key formed with a stem, a screw entering said screw hole and formed in its inner end with a recess into which the key stem extends, and a spring in said recess around said key stem.

In testimony whereof, I have signed this specification in the presence of two subscribing witnesses.

GORDON WILLIAMS.

Witnesses:
EMILY C. DAVIS,
MARTHA M. THEISS.

Copies of this patent may be obtained for five cents each, by addressing the "Commissioner of Patents, Washington, D. C."